(12) United States Patent
MacFarland

(10) Patent No.: US 6,722,724 B1
(45) Date of Patent: Apr. 20, 2004

(54) FOUR SECTION RETRACTABLE HARD TOP

(76) Inventor: David P. MacFarland, Heimgartenstrasse 14b, 85716 Unterschleissheim (DE)

( * ) Notice: Subject to any disclaimer, the term of this patent is extended or adjusted under 35 U.S.C. 154(b) by 0 days.

(21) Appl. No.: 10/353,654

(22) Filed: Jan. 29, 2003

(51) Int. Cl.[7] .................................................. B60J 7/14
(52) U.S. Cl. ........................... 296/107.17; 296/107.01; 296/107.07; 296/108
(58) Field of Search ....................... 296/107.01, 107.07, 296/107.16, 107.17, 108

(56) References Cited

U.S. PATENT DOCUMENTS

| | | | | |
|---|---|---|---|---|
| 6,572,175 | B2 * | 6/2003 | Schutt et al. | 296/107.17 |
| 6,592,169 | B2 * | 7/2003 | Obendiek | 296/107.17 |
| 2001/0019213 | A1 * | 9/2001 | Eberle | 296/107.17 |
| 2001/0020793 | A1 * | 9/2001 | Eberle | 296/107.17 |
| 2002/0185885 | A1 * | 12/2002 | Biecker et al. | 296/108 |
| 2003/0085587 | A1 * | 5/2003 | Reinsch | 296/107.17 |

FOREIGN PATENT DOCUMENTS

| | | | | |
|---|---|---|---|---|
| DE | 003903358 A1 * | 8/1990 | | 296/107.09 |
| DE | 004316485 A1 * | 11/1994 | | 296/108 |

* cited by examiner

*Primary Examiner*—D. Glenn Dayoan
*Assistant Examiner*—Lori L Coletta
(74) *Attorney, Agent, or Firm*—David A. Greenlee

(57) ABSTRACT

A retractable hard top for convertibles, in particular for four-seated convertibles, includes, sequentially, a first, front section, a second section, a third section and a fourth, rear section. Each section has a front, first edge portion and a rear, second edge portion The first and the second sections substantially form the roof ceiling in the closed position of the hard top, while the third section forms the C-pillar and is open rearwardly, and the fourth section includes the backlite and closes the opening in the third section. The sections are pivotally connected by a linkage which compactly folds the top for storage in a storage compartment. All four sections are inverted and nest within one another, with their respective first edge portions being positioned in the longitudinal vehicle direction behind the second edge portions.

10 Claims, 12 Drawing Sheets

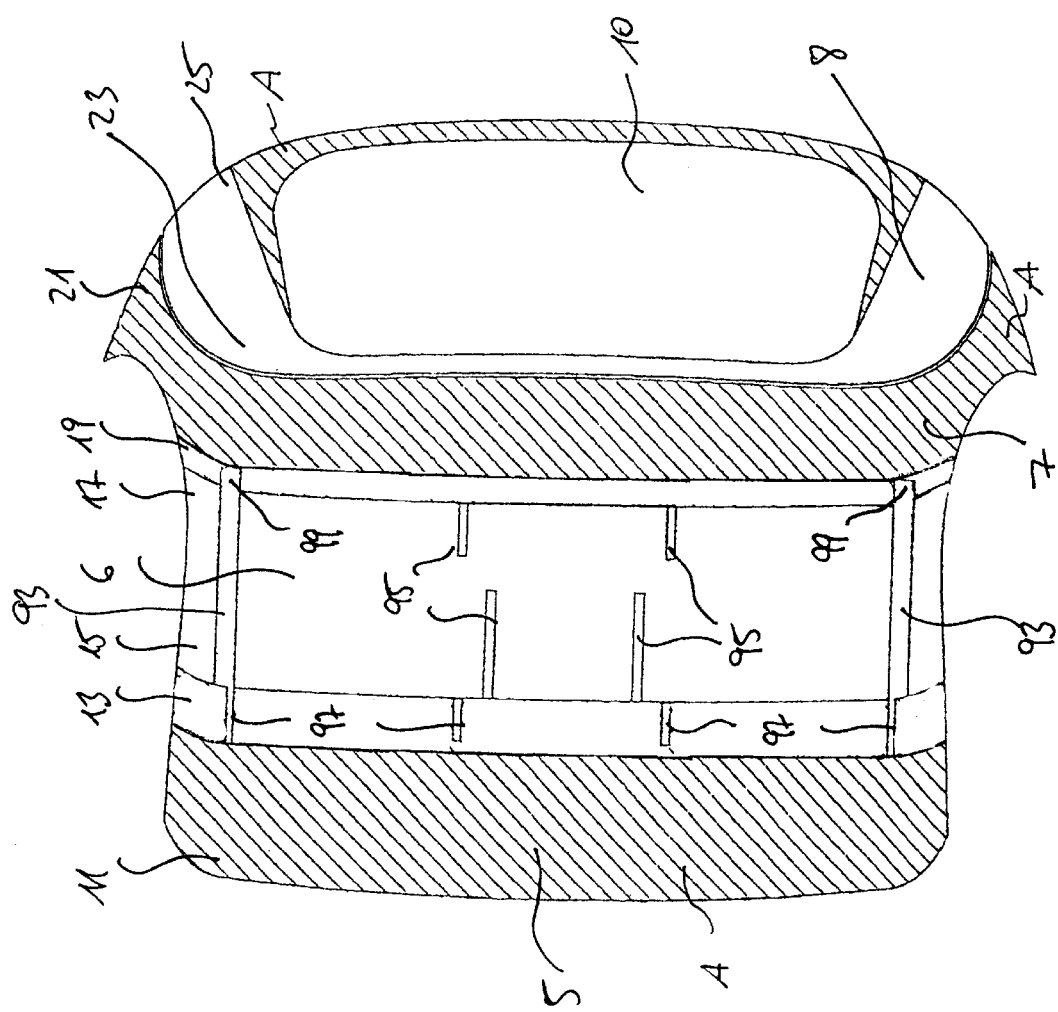

FOUR SECTION RETRACTABLE HARD TOP

BACKGROUND OF THE INVENTION

1. Field of the Invention

The present invention relates to a retractable hard top for a convertible vehicle and, more particularly, to a four section hardtop for a four-seat convertible.

2. Description of Related Art

Since convertibles are increasingly used as all-season vehicles, hard tops have significant advantages regarding ruggedness, resistance against snow load, susceptibility to wind, and noise pollution in the interior of the motor vehicle compared to conventional vehicle soft tops, which consist of lateral bows covered with cloth. Hard tops of this type are normally installed when the soft top is lowered in the winter, and are taken off and stored at a separate location when the weather is warmer. However, currently there is a trend toward replacing the soft top with a retractable hard top. These retractable hard tops operate in a similar manner as a soft top: are folded backwards and are retracted and extended by means of a power operator located a top storage compartment located in or adjacent the vehicle trunk. In these, the top is divided into two sections, which fold in a clamshell arrangement for storage. These tops are used in two seat convertibles and are bulky, and are unsuitable for four-seat convertibles.

A known retractable hard top is disclosed in European Patent Application EP 1 092 579 A1, and comprises three roof sections or shells. When pivoting the top from an unfolded, extended roof position into a retracted, stored position, the second, central roof section moves into the rear roof section and at the same time the first, front roof section moves over the second, central roof section, and along this roof section and subsequently between same and the rear roof section in the folded condition. The outside surfaces of the three roof sections rest upside down, with the first roof section located between the second and the third roof sections.

This three-piece hard top offers, compared to prior two-piece hard tops, a significant improvement of the convenience and the size of the passenger compartment. It is, however, only suitable to a limited extent for a four-seat convertible. The disadvantage of this arrangement is the relatively large space required in the retracted condition that is caused by the length and size of the rear roof section.

It would be desirable to provide a retractable hard top, which is suitable for large motor vehicles, in particular for four-seat convertibles and which provides a large space in the interior of the passenger compartment and still enables a trouble-free retraction process and takes relatively little space in the retracted condition.

SUMMARY OF THE INVENTION

It is an object of the present invention to provide a retractable hard top, which is suitable for large motor vehicles, in particular for four-seat convertibles and which provides a large space in the interior of the passenger compartment and still enables a trouble-free retraction process and takes relatively little space in the retracted condition.

In one aspect, this invention features retractable hard top which comprises a first, front section, which can be connected to the upper edge portion of the windshield, a second section, which in the closed position of the hard top adjoins the first section, a third section adjoining the second section, and a fourth, rear section adjoining the third section, wherein each section has a front, first edge portion and a rear, second edge portion. The first and the second section basically form the roof ceiling in the closed position of the hard top. The third section basically forms the C-pillar and the fourth section closes the upper portion of the passenger compartment towards the back. The sections or shells are pivotable into and out of a storage compartment in the vehicle body, and each of the sections is attached in a manner that it can be pivoted backwards downwards during the opening process, so that, in the open position of the hard top, all four sections are nested within one another with their respective first edge portion in the longitudinal vehicle direction being positioned behind the second edge portion. This provides a very compact arrangement of the four top sections in stored position.

By the use of four roof sections which fold and stack as described, it is possible to make the passenger compartment significantly larger than before because the space required for hard top storage has been significantly reduced a result of the compactness of the folded top.

It is advantageous with respect to reliability, that the first, second and third sections are connected through a plurality of pivotal connections symmetrically arranged at the two outer portions of the hard top and pivotally connected with one another.

The first, second and third sections are especially advantageously connected with one another via pivotal connections arranged in the area of the roof center between the outer portions of the hard top and pivotally connected with one another, through which a greater structural strength of the hard top against snow load, a greater stability of the mechanic drive, and also a better leverage is achieved.

Longitudinal slots are advantageously provided in the second section in the outer portions and in the area of the roof center. These slots enable the pivotal connections to pass through the roof line during opening and closing of the hard top, by facilitating the first section to movement over the second section.

In the second edge portion of the first section, longitudinal slots are arranged in the outer portions and in the area of the roof center as well as in the first edge portion of the third section in the outer portions. These slots also enable these pivotal connections to pass through the roof line during opening and closing of the hard top, which further increases compactness of the hard top in the retracted position.

The hard top advantageously comprises a flexible cloth cover, in particular made of a fabric or other conventional soft top fabric, which overlies the first, third and fourth sections in top closed condition, so that the transverse slots in the transitional area between two roof sections and the longitudinal slots in the vehicle roof area are covered in a water-proof manner and an aesthetically pleasing overall impression is created.

During the opening of the hard top, the first, front section is advantageously firstly moved over the second section and subsequently between this section and the third section, which reduces the overall height of the hard top during the opening process.

It is advantageous, in the form of the small space required by the folded hard top, that the fourth section is moved into the third section during the opening of the hard top.

Further objects, details, features and advantages of the invention can be derived from the following detailed description with reference to the drawings, wherein:

DESCRIPTION OF THE DRAWINGS

FIG. 11 is a plan view of the retractable hard top according to this invention, shown without hardware and with the four sections in closed condition to illustrate the attachment of the fabric covering.

DETAILED DESCRIPTION OF THE INVENTION

Figure 1:
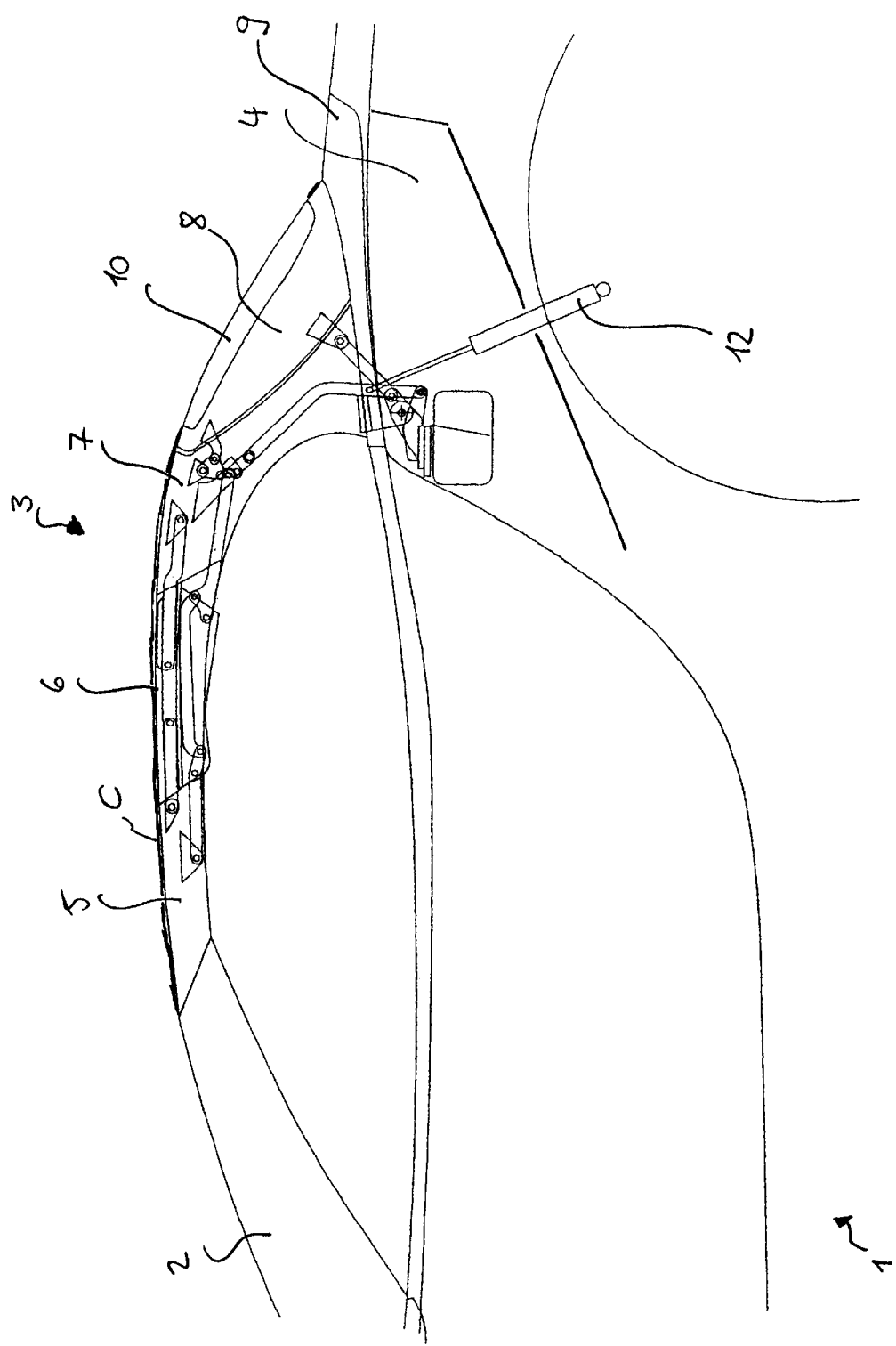
FIG. 1 is a schematic side view of a retractable hard top according to the invention in the closed condition, mounted into a convertible.

FIG. 1 shows a motor vehicle 1 in the form of a convertible, which has a large passenger compartment. The motor vehicle 1 has a windshield 2, a retractable hard top 3 as a cover for the passenger compartment of the convertible and a storage compartment 4 in which the retracted hard top is stored in its retracted position. The convertible is in the present case illustrated as a very spacious two-seated vehicle, wherein the hard top according to the invention is particularly also suitable for four-seated convertibles.

Figure 2A:
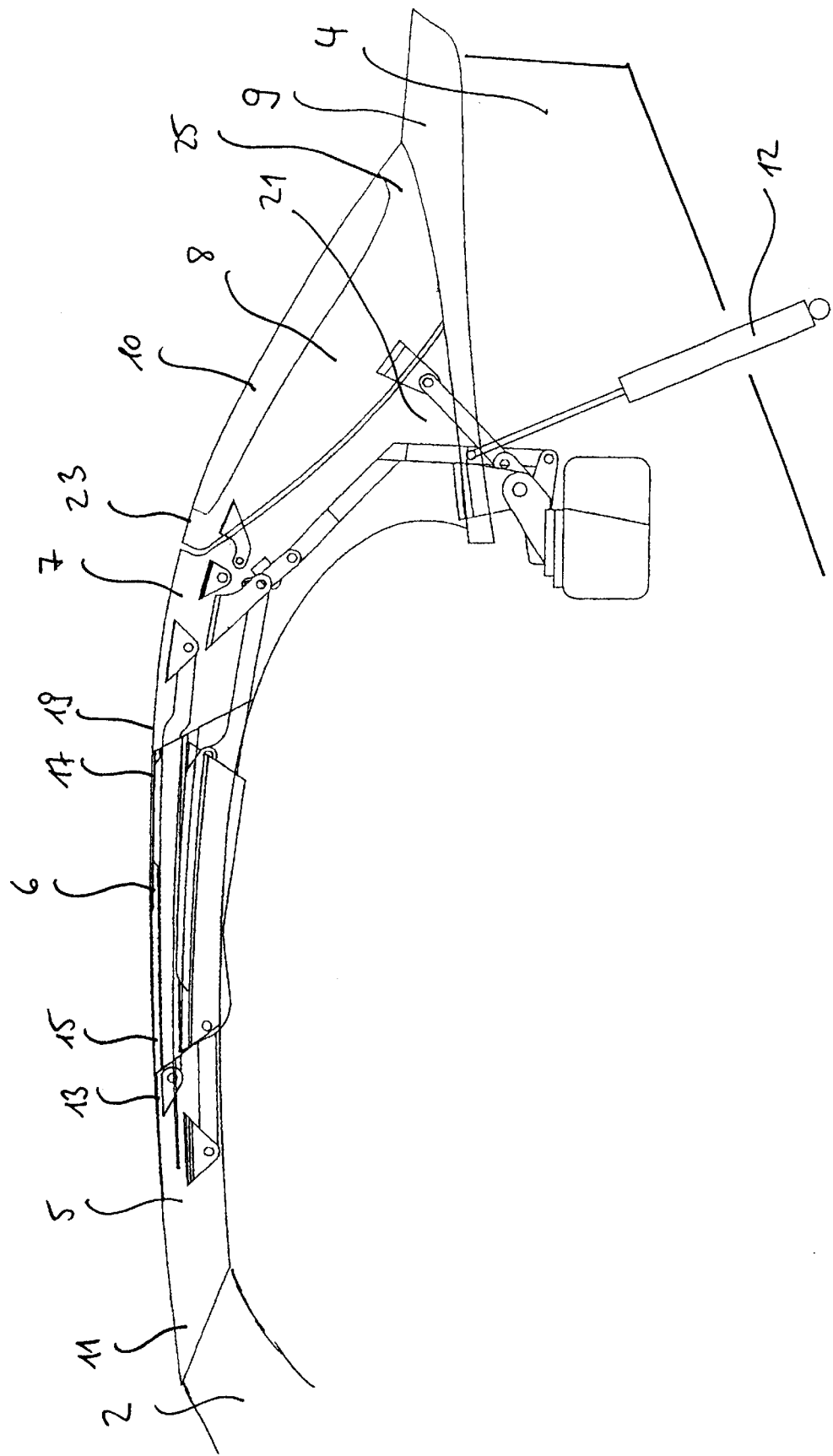
FIG. 2a is a schematic side view of the retractable hard top of FIG. 1 in closed position, without illustration of further chassis elements, but without illustration of further chassis elements.

As may best be seen from the detail depiction in FIG. 2a, in which the hard top is shown in the closed condition, the hard top 3 has a total of four rigid roof sections or shells. The first, front section 5 and the adjoining second section 6 substantially form the roof ceiling of the passenger compartment of the motor vehicle. The third section 7 adjoining towards the back the second section 6 forms the C-pillar of the vehicle, whereas the fourth, rear section 8 closes the passenger compartment towards the back. In the present example, a rear window or backlite 10 is integrated in the rear section 8. The storage compartment 4 is closed towards the top by a conventional tonneau 9 that is powered by a conventional drive mechanism, (not shown). A conventional latch mechanism (not shown) is provided on the upper edge of the windshield 2 to conventionally latch the front section 5 to the hard top 3 to windshield 2. The hard top sections 5, 6, 7, 8 each has respective front, first edge portions 11, 15, 19 and 23, and respective rear, second edge portion 13, 17, 21 and 25.

Figure 2B:
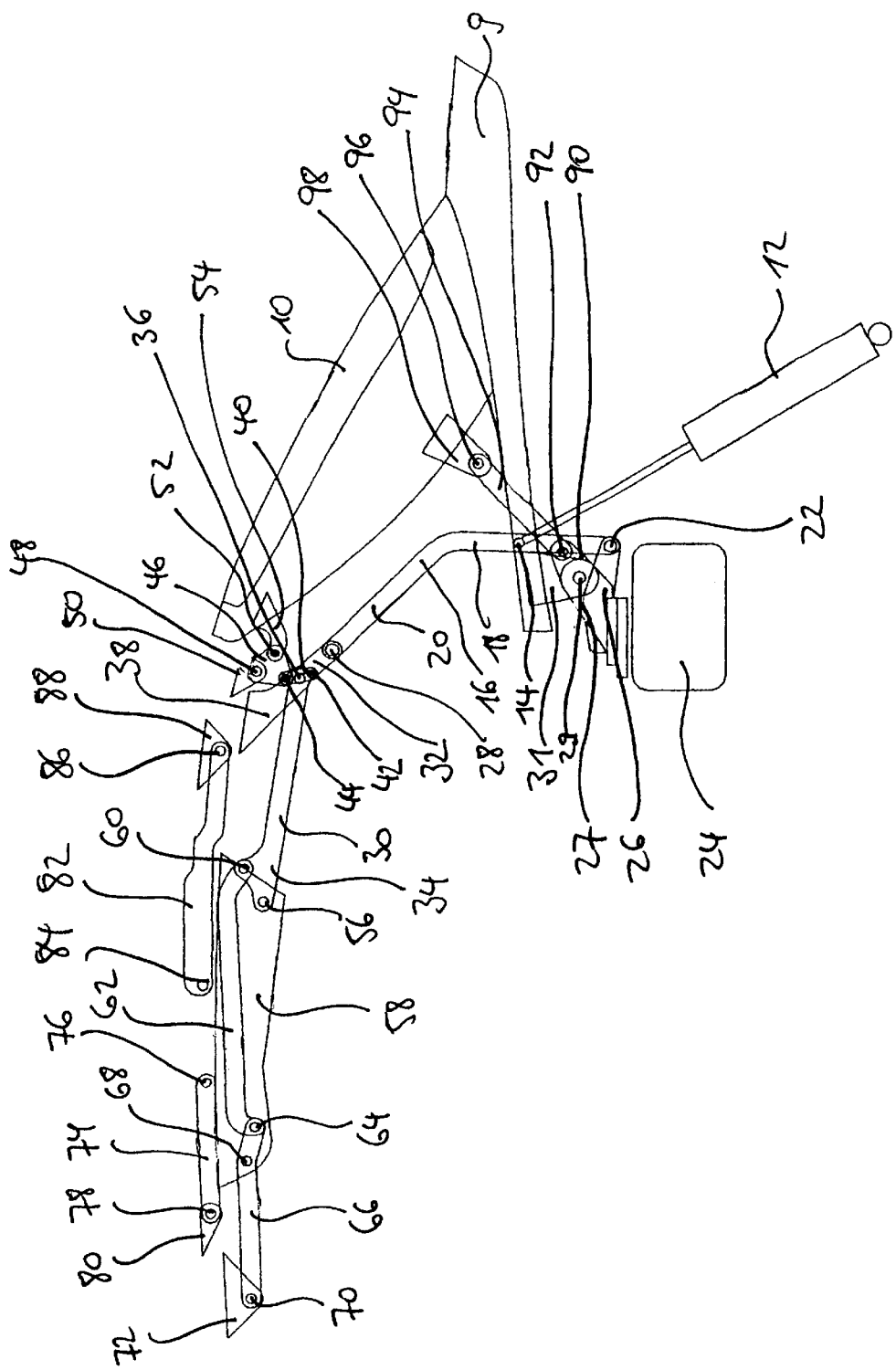
FIG. 2b is a schematic side view similar to FIG. 2, except that for reasons of clarity the first three sections of the hard top are not shown.

The structure and the arrangement of the pivotal connections interconnecting these sections can best be seen in FIG. 2b, where, for reasons of clarity, the first three roof sections 5, 6 and 7 are not shown. Otherwise, all mechanical components on one side of the top (it is symmetrical about a longitudinal axis) are shown in detail with reference numerals. In FIGS. 3 to 10 only some of the mechanical main components are shown with reference numerals to improve the illustration.

A hydraulic cylinder 12 is arranged in the area of the storage compartment 4, to power movement of the hard top 3 according to the invention. The hydraulic cylinder 12 is pivotally connected to the main bracket 16 of the third roof section 7 at connection point 14, and pulls this roof section obliquely backwards down during the opening movement of hard top 3. The main bracket 16 has an angular shape with two legs, wherein the lower leg 18, having a pivot 14 defined in its central portion, is arranged substantially perpendicularly in the closed position of the hard top, and the somewhat longer upper leg 20 is angled transversely towards the front top. On the lower end of its lower leg 18, at pivot point 22, the main bracket 16 is pivotally connected to the rear end of a rigid support bracket fixedly attached at the mounting block 24, with bearing bracket 26 extending almost horizontally.

A further fixedly attached support bracket 27 projects from the mounting block 24 obliquely in the rear top direction. On its upper end it is pivotally connected to a connection member 31 at the pivot point 29, said connection member being fixedly connected to the lower portion of the third roof section 7.

At the upper end of the upper leg 20 of main bracket 16, this main bracket 16 is pivotally connected at pivot point 28 to the angular, basically forwardly oriented, angular hinge bracket 30. The hinge bracket 30 has a short lower leg 32, arranged parallelly with respect to the upper leg 20 of the main bracket 16, and essentially horizontally aligned long upper leg 34. In the angular transitional portion between the two legs 32 and 34 a short connection bracket 38 first of all arranged in pivot point 36 parallel to the lower leg 32 is attached, said short connection bracket being fixedly connected at its upper end to the third roof section 7.

In the proximity of pivot point 36, a further short connection member 40 at the hinge bracket 30 is pivotally attached at pivot point 42. On its upper end member 40 it is pivotally connected to a triangular connection plate 46 at pivot point 44; connection plate 46 has two further pivot points in its two other corners. The front pivot point 48 provides a movable connection to the short connection rod 50, which on its upper end is fixedly connected to the third roof section 7. The rear pivot point 52 generates a pivotal connection to the connection rod 54, which is mounted at its rear end to the fourth roof section 8.

On the front end, the upper leg 34 of the hinge bracket 30 is movably connected at pivot point 56 to the shell-shaped inset 58, which is attached in the second roof section 6 by any suitable means, such as by gluing. In a bulging of the upper leg 34, said bulging not being remote from the pivot point 56, Leg 34 is pivotally connected to a further bracket 52 in pivot point 60. This bracket 62 has a generally U-shape, with the two short legs projecting downwardly, and the connecting long central section extends essentially horizontally. On the leg opposite pivot point 60 the other leg has a pivot point 64 that provides a pivotal connection to the front bracket 66. The shape and arrangement of the front bracket 66 is very similar to the angular hinge bracket 30, although it is pivotally connected to the shell-shaped inset 58 in the angular transitional portion between its two legs in pivot point 68. On its front end, front bracket 66 is pivotally connected to the connection member 72 at pivot point 70; Member 72 is fixedly connected to the first hard top section 5. It is also contemplated to eliminate the shell-like inset and mount then the pivot points integral with the second roof section 6.

All previously described elements are symmetrically arranged at both longitudinal sides of the vehicle, although in side view only one side can be shown.

In the hard top system according to the invention, a further pivotal connection exists between the three front hard top sections, which are arranged more in the vehicle center, i.e. between the heads of driver and passenger. A first mounting bracket 74 is pivotally connected in the pivot point 76 to the second hard top section 6 and extends from there substantially parallelly to it in a straight line forwardly, where it is pivotally connected at pivot point 78 to the connection member 80, which in turn is fixedly connected to the first hard top section 5.

The connection between the second and the third roof section is provided by the connection bracket 82, which also extends almost horizontally and which is pivotally connected to the second hard top section 6 at its front end at pivot point 84. At its rear end, the connection bracket 82 is pivotally connected to the connection member 88 at pivot point 86, and is fixedly mounted to the third hard top section 7.

As already mentioned, the two connection brackets 74 and 82 are arranged rather in the vehicle center. For reasons of symmetry and construction they also exist in double version at symmetrical distances from the vehicle center. As may naturally be derived from the slightly convex shape of the hard top sections, the two brackets 74 and 82 are clearly elevated higher than the remaining brackets extending on the longitudinal sides of the motor vehicle, which leads to some advantages for the top mechanism. Due to the difference in height, a greater lever effect can be achieved, without restricting the head freedom of the passengers of the convertible, as was formerly required when placing the brackets also on the longitudinal sides of the vehicle. Moreover, the central brackets 74 and 82 support the hard top sections in the case of a high snow load in winter and are responsible for an even stronger stability and ruggedness of the top construction and for a better guide in the relative pivoting of the sections during the folding and unfolding processes.

Finally, the fourth hard top section 8 is connected in the direction of its lower edge portion to a mounting bracket 90 fixedly connected to the mounting block 24. On the upper end of the obliquely backwardly upward oriented mounting bracket 90 it is pivotally connected to a straight connection bracket 94 at pivot point 92. The other end of the connection bracket 94 is pivotally connected to the connection member 98 at pivot point 96; it is fixedly mounted to the fourth hard top section 8. This mechanism is in turn arranged at the two longitudinal sides of the vehicle and serves for automatic retraction of the fourth hard top section 8 into the interior of the third section 8 during retraction of the hard top 3.

The mode of operation of the retractable hard top 3 is now described particularly with reference to FIGS. 3 to 10.

Figure 3:
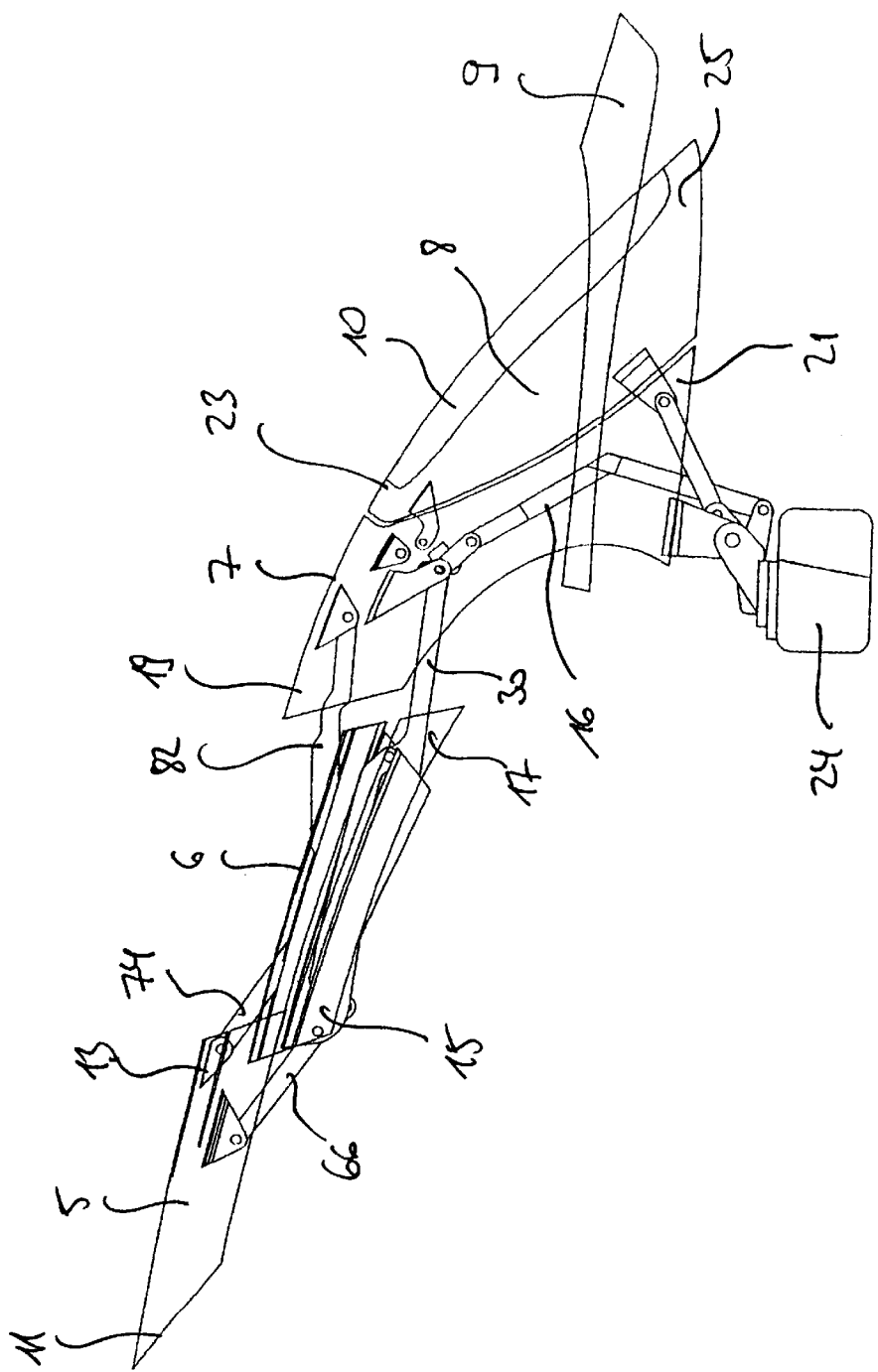
FIGS. 3 to 8 are a sequence of schematic side views of the retractable hard top, showing the opening cycle of the hard top from the slightly open position to the nearly fully retracted position.

FIG. 3 shows a slightly opened position of the hard top 3 according to the invention. In addition to the elevation of the first hard top section 5 caused by the contraction of the hydraulic cylinder 12 and the above described constructive mechanical design of the hinge brackets, the upward pivot movement of the hard top section can be supported upwardly additionally by conventional support mechanisms within the framework of the locking device or the holding means, for instance by the force of a motor.

Figure 4:
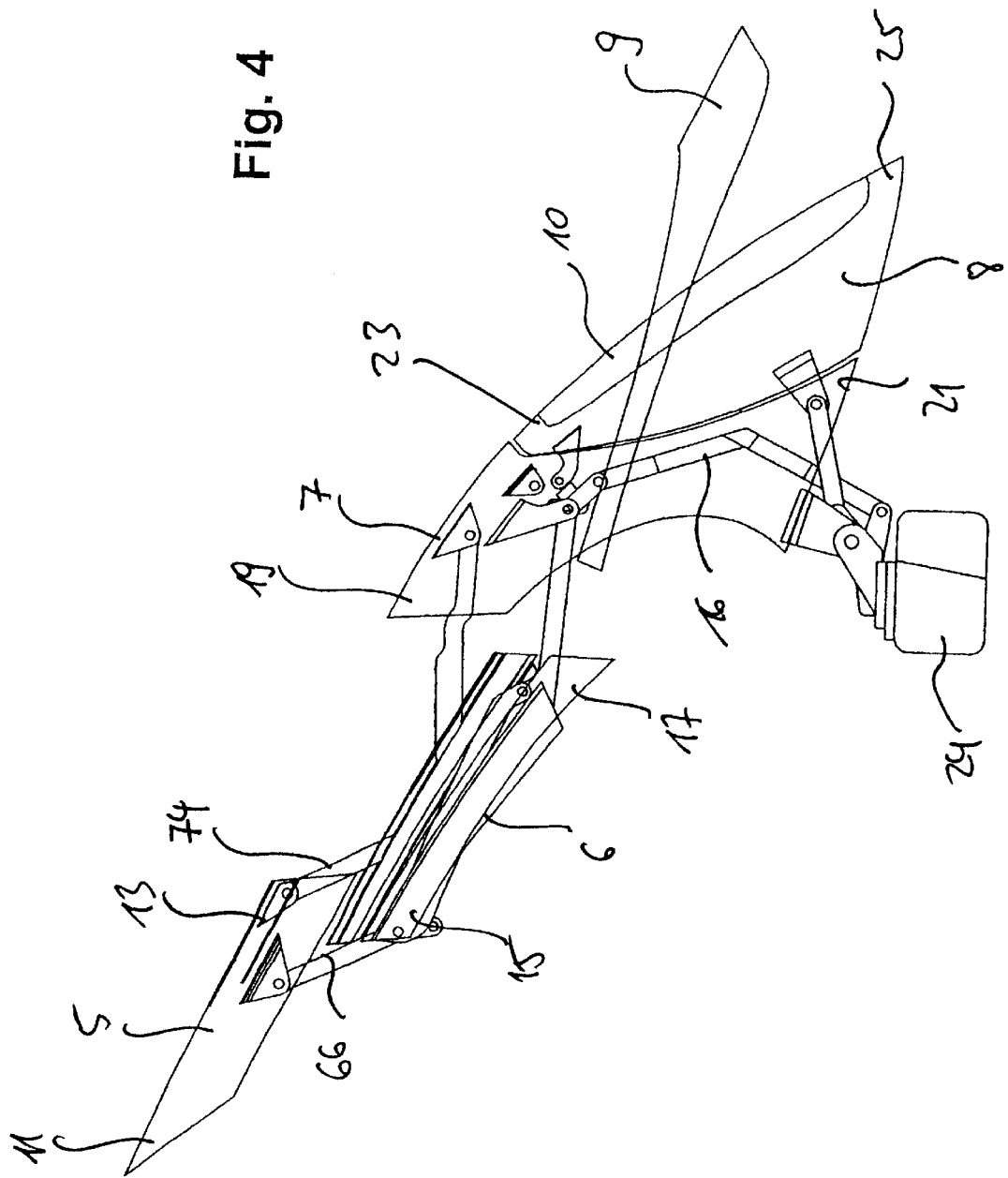
Figure 5:
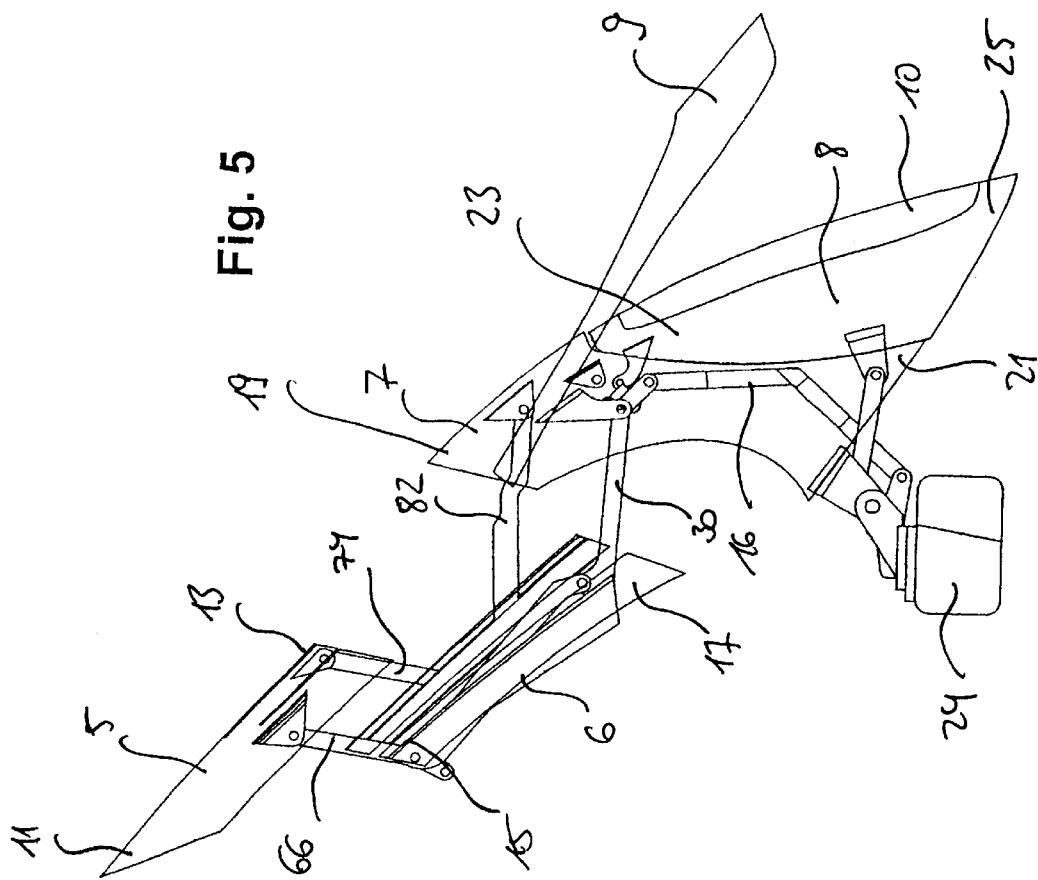
Figure 6:
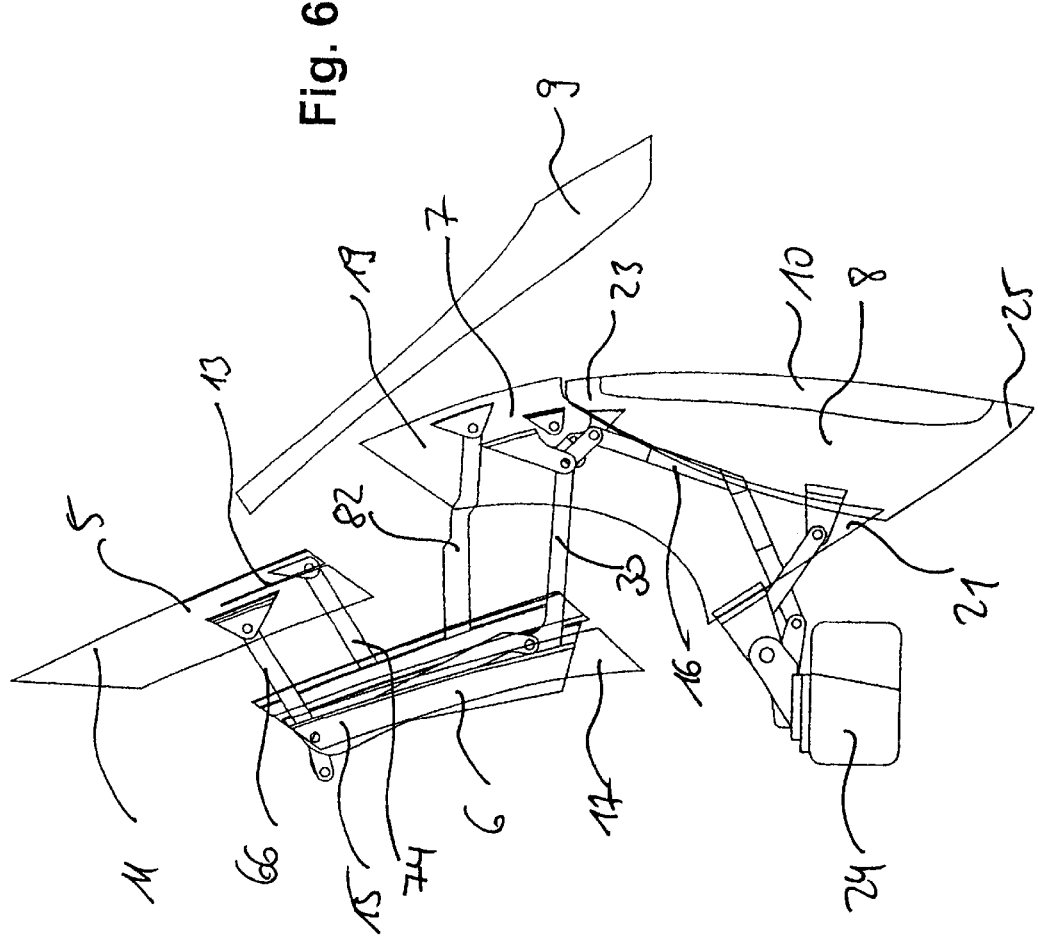
Figure 7:
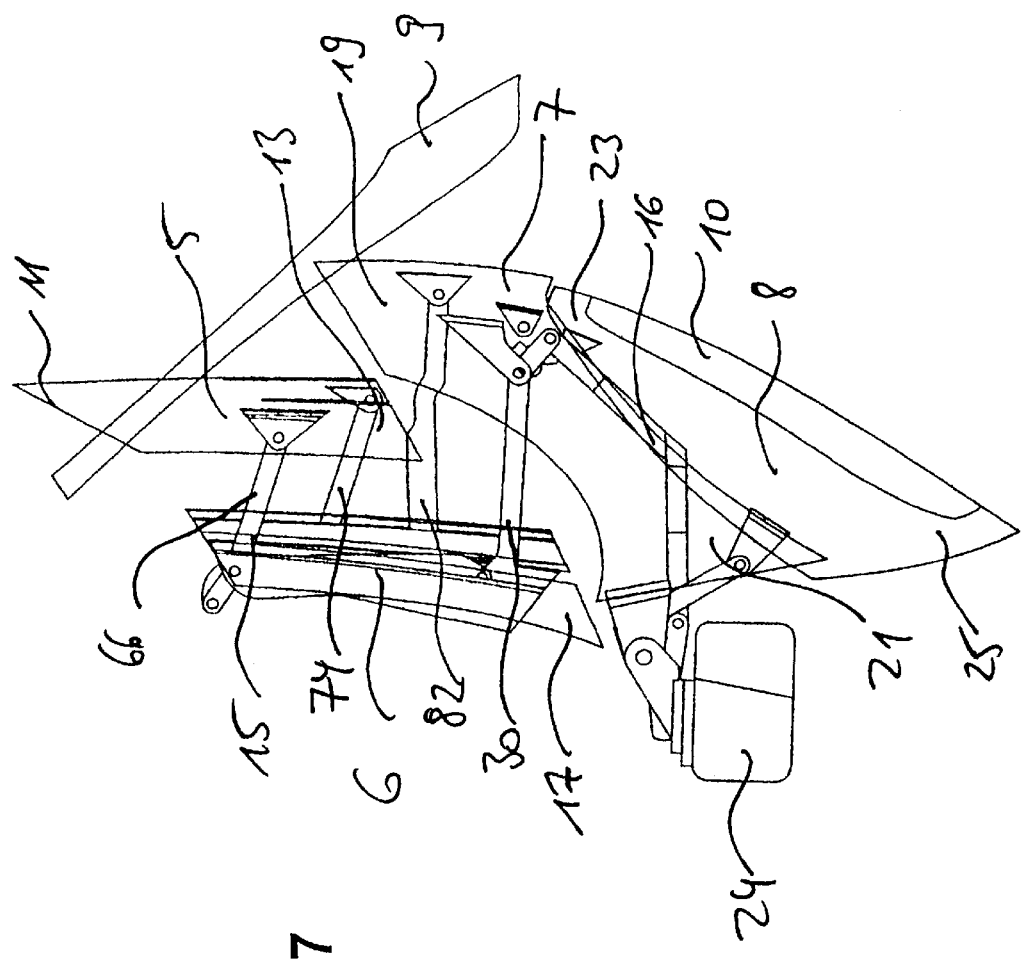
Figure 8:
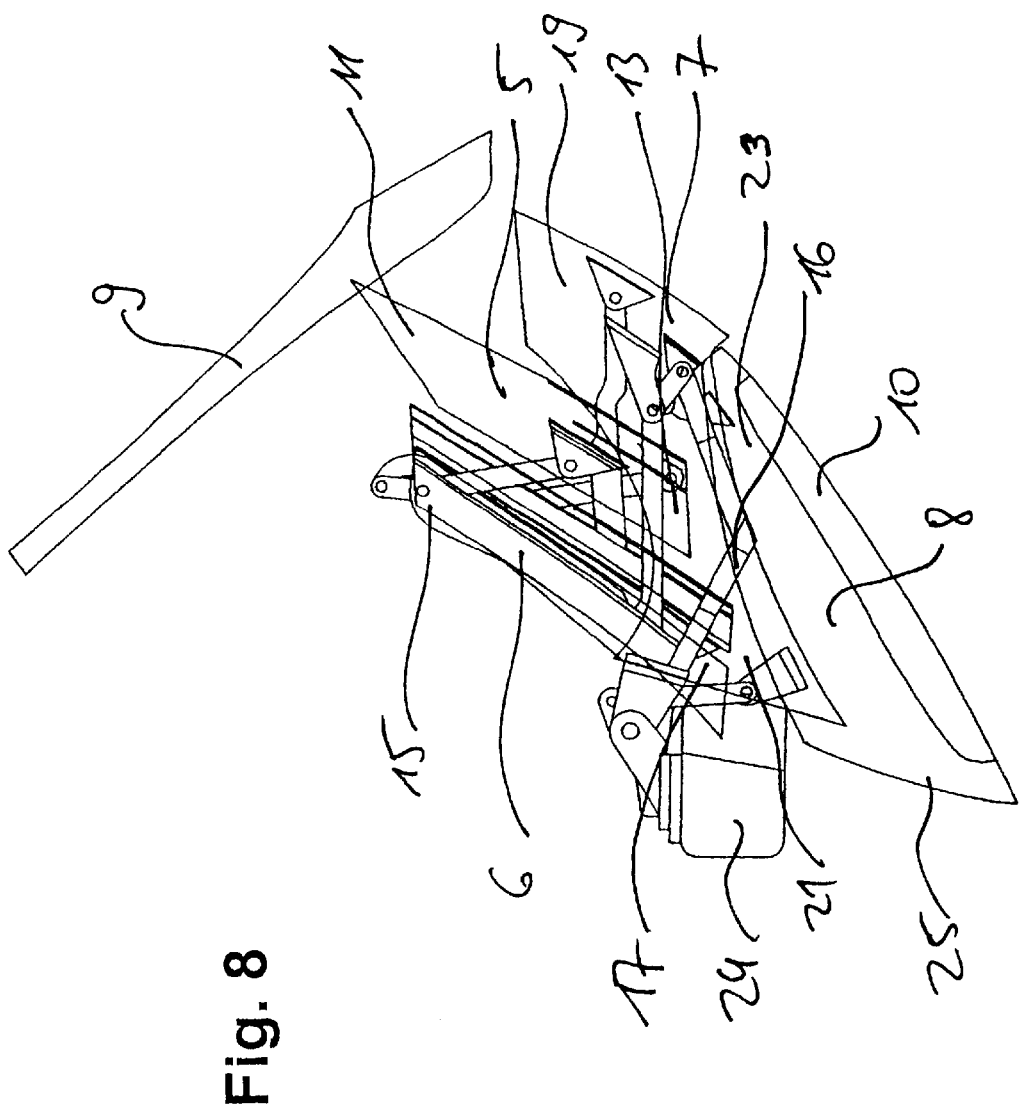
Figure 9:
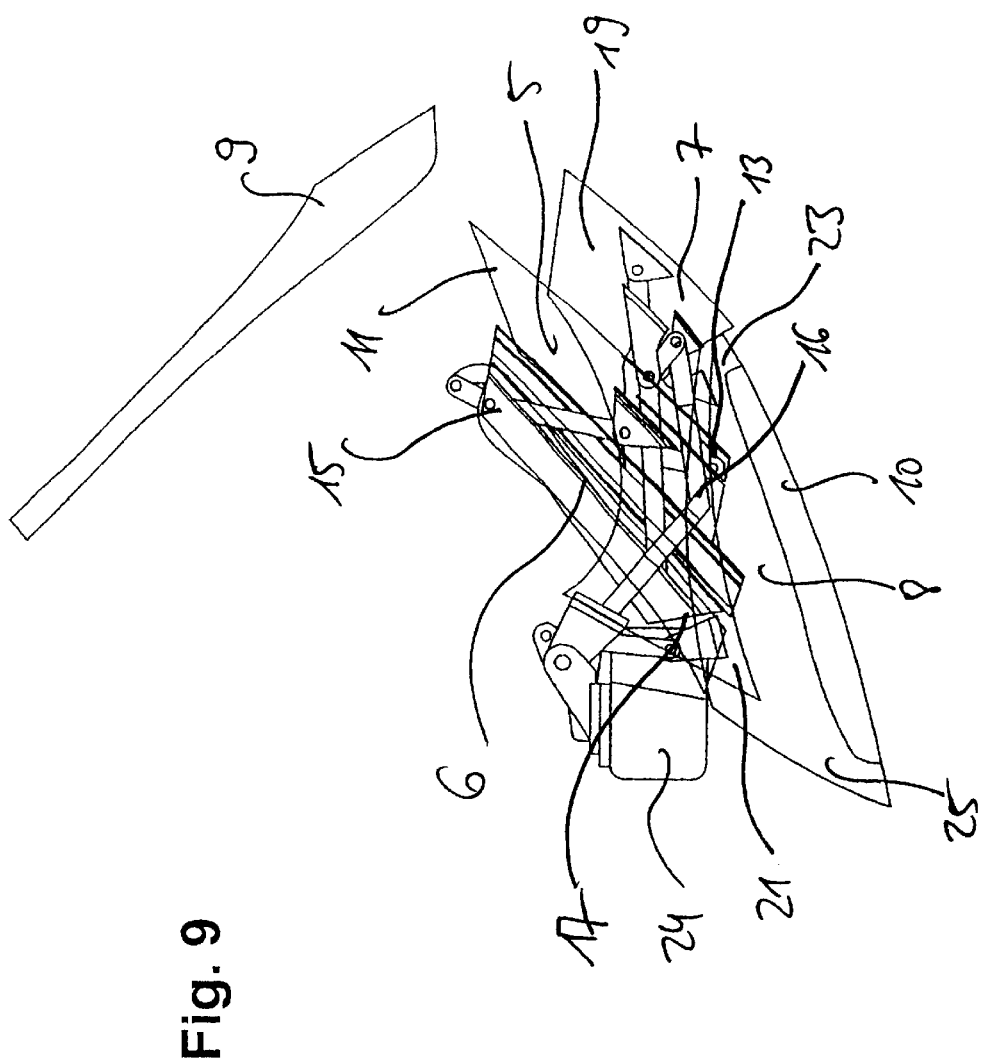
FIG. 9 is a schematic side of the fully retracted hard top when the tonneau covering the top storage compartment is open.

It can clearly be seen in FIGS. 4 and 5 that the front edge portion of the tonneau 9 of the storage compartment 4 has moved upwards sufficiently far that the lowering process of the hard top 3 into the storage compartment 9 is not obstructed. As may be seen from FIGS. 4 to 10, the two front hard top sections 5 and 6 are now lowered backwards downwards simultaneously to the hard top sections 7 and 8, wherein the front section 5 first of all moves over the lowering second section 6 and subsequently moves between the second section and the third section. This correlated movement is caused by the operation of the hydraulic cylinder 12 only, which in the present mechanical construction leads to the movement of the individual roof section in particular via an interaction of the pivotally interconnected main bracket 16, hinge bracket 30, bracket 62 and front bracket 66, and via the two central brackets 74 and 82.

In the course of the movement, the fourth hard top section 8 is additionally retracted via the connection rod 92 into the interior of the third hard top section 7, which leads to a significant saving of space.

Figure 10:
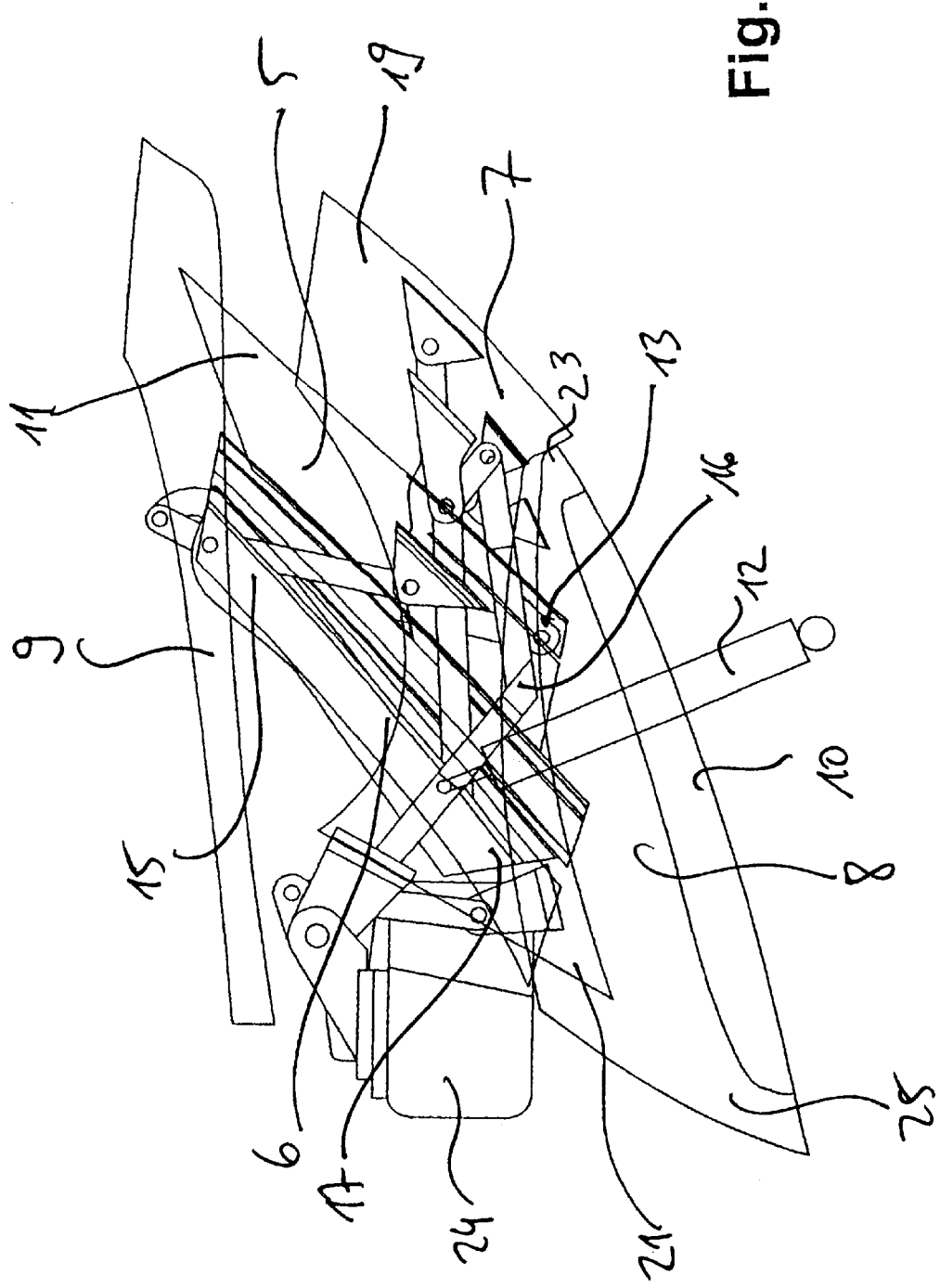
FIG. 10 is an enlarged schematic view of the fully retracted hard top when the tonneau covering the top storage compartment is closed.

As may best be seen in FIG. 10, the four hard top sections are in the collapsed final position in a nested condition, wherein the first edge portion 11, 15, 19 and 23, respectively, is now located behind the second edge portion 13, 17, 21 and 25, respectively, seen in the longitudinal direction of the vehicle. The movement of the individual hard top sections basically resembles a rotation about a variety of moved rotary axes extending horizontally in the transverse vehicle direction in the area of the mounting block around which axes the individual section move into the storage compartment, wherein they are substantially inverted.

It can also be seen from FIGS. 3 to 10 that the central brackets 74 and 82 and the lateral front brackets 66 and the hinge bracket 30 must pass the second hard top section 6 during the folding-in movement of the hard top 3, in order to make the mechanism shown applicable and operative.

As may be derived from the top plan view onto the hard top system of FIG. 11 according to the invention, longitudinal slots are arranged in the second roof section 6 which serve for passing the respective brackets. In the outer portion, these are continuous longitudinal slots 93 for passing the front brackets 66 and the hinge brackets 30, while in the area of the roof center further longitudinal slots are provided for passing the connection brackets 74 and 82. To attain a trouble-free operation and an optimization of the mechanism and to achieve a minimal space requirement in the open position of the hard top, further longitudinal slots 97 are arranged in the rear edge portion 13 of the first hard top section 5 and in the outer portions as well as in the area of the roof center and also in the front edge portion 19 of the third hard top section 7.

In order to cover the slots in the roof section, a cover C is glued onto large areas A of the first, third and fourth roof sections. An example for the surfaces on which the foil is glued is shown by hatched portions in FIG. 11. The cover C is not attached to the second section 6, but is pulled tautly over it when the top is fully condition. This provides a weather-tight seal for the entire top, the slots and lateral joints between the sections included.

Thus, a construction is provided by the hard top system according to the invention, which can also be used in vehicles having a large passenger compartment and which is stable, robust and reliable and requires relatively little when retracted.

I claim:

1. A retractable hard top for a convertible having a windshield, a body, a top storage compartment in the body closed by a tonneau, said hardtop being movable between an extended unfolded condition covering a passenger compartment and a folded, stored condition in the compartment comprising a first, front section, which is adapted to be connected to the upper edge portion of the windshield, a second section joining the first section when the hard top is unfolded, a third section joining the second section, and a fourth, rear section adjoining the third section, wherein each section has a front, first edge portion and a rear, second edge portion, wherein the first and the second sections substantially cover the passenger compartment when the top is unfolded, the third section forms the convertible body C-pillar, and the fourth section closes the upper portion of the passenger compartment towards the back, and pivot means pivotally interconnecting the sections for folding into a compact folded condition for storage, and for unfolding into an unfolded condition covering the passenger compartment, wherein the pivot means interconnect the sections for movement backwardly downwardly when folding the top, so that in the folded position four sections are nested within one another, with their respective first edge portions being positioned in the longitudinal vehicle direction behind the second edge portions.

2. A hard top as claimed in claim 1, characterized in that the first, second and third sections are arranged and pivotally connected via a plurality of hinge brackets arranged symmetrically at the two outer portions of the hard top.

3. A hard top as claimed in claim 2, characterized in that the first, second and third sections are connected via hinge brackets arranged in the area of the roof center between the outer portions of the hard top, and pivotally connected with one another.

4. A hard top as claimed in claim 3, characterized in that first longitudinal slots are arranged in the second section in the outer portions and in the area of the roof center, said slots for enabling passage of hinge brackets therethrough during folding and unfolding of the hard top.

5. A hard top as claimed in claim 4, characterized in that second longitudinal slots are arranged in the second edge portion of the first section in the outer portions and in the area of the roof center for enabling passage of the pivotal connections therethrough during folding and unfolding of the hard top.

6. A hard top as claimed in claim 5, characterized in that third longitudinal slots are arranged in the first edge portion of the third section in the outer portions, said slots enabling passing hinge brackets therethrough during folding and unfolding of the hard top.

7. A hard top as claimed in claim 1, characterized in including a flexible cloth cover, connected to the first, third and fourth sections and overlying all sections un unfolded condition of the hardtop.

8. A hard top as claimed in claim 1, characterized in that the first, front section moves during folding between the second section and the third section.

9. A hard top as claimed in claim 8, characterized in that the fourth section moves into a position within the third section during folding of the hard top.

10. A hard top as claimed claim 9, characterized in that a rear window is integrated into the fourth section.

* * * * *